United States Patent Office 2,872,588
Patented Feb. 3, 1959

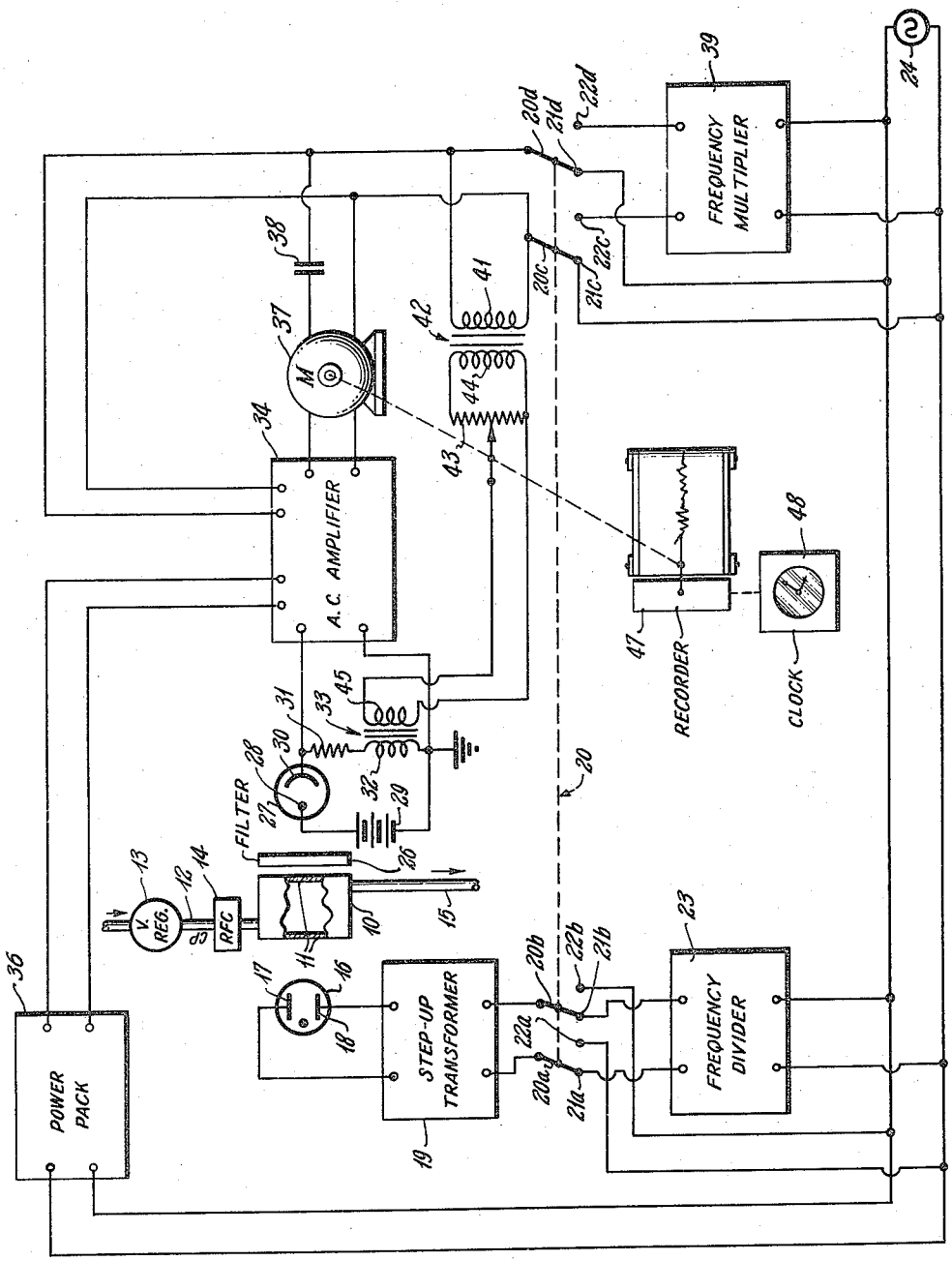

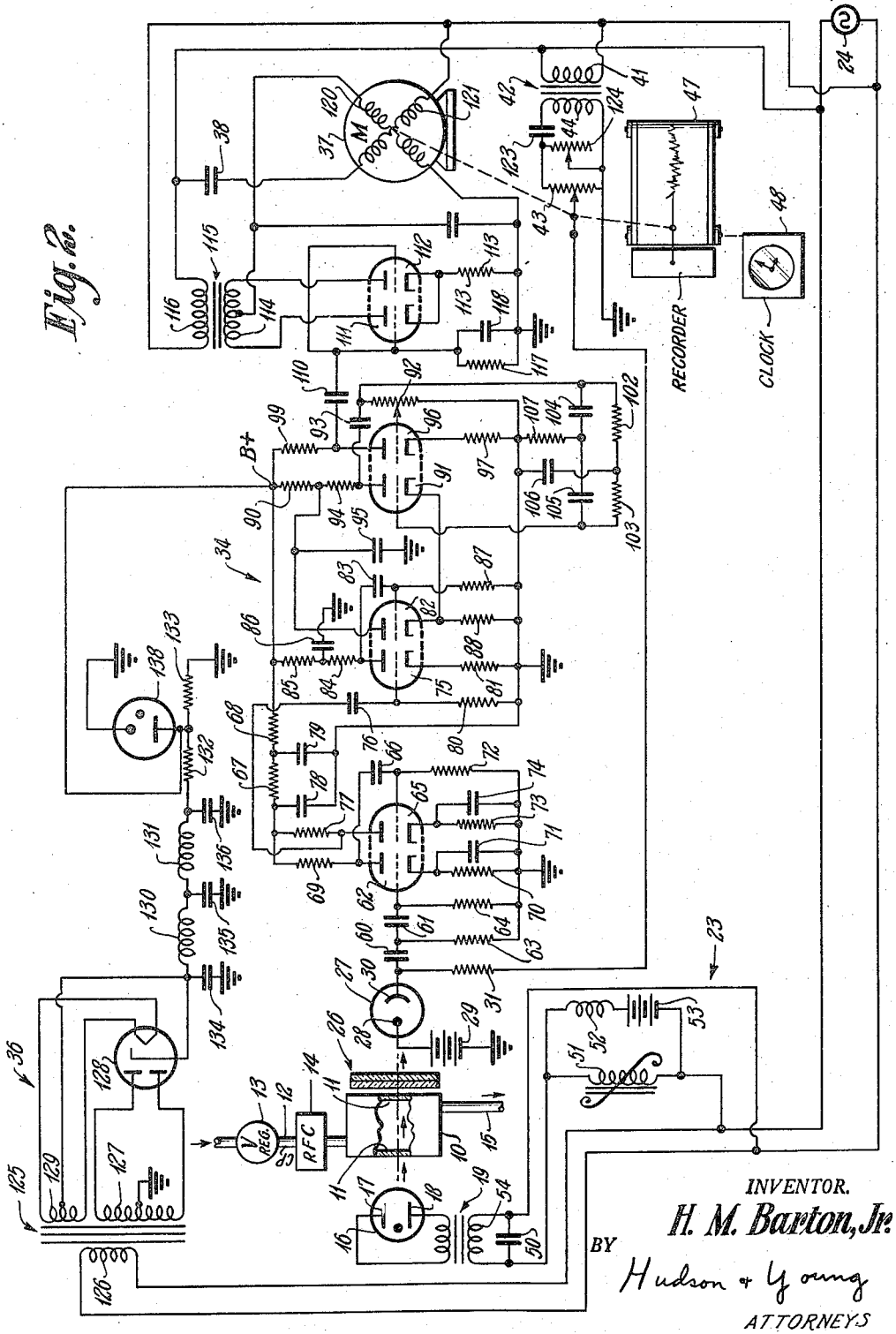

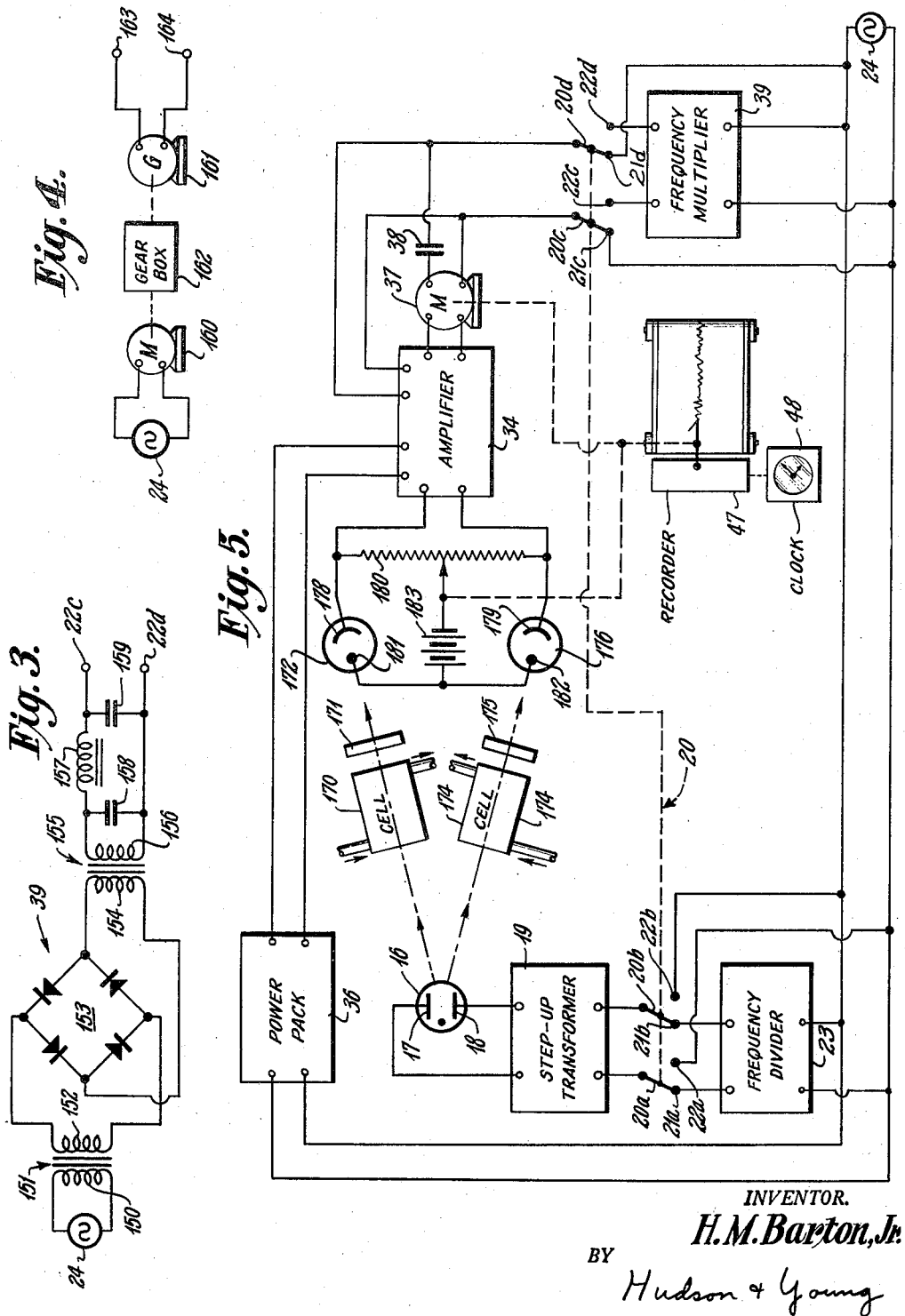

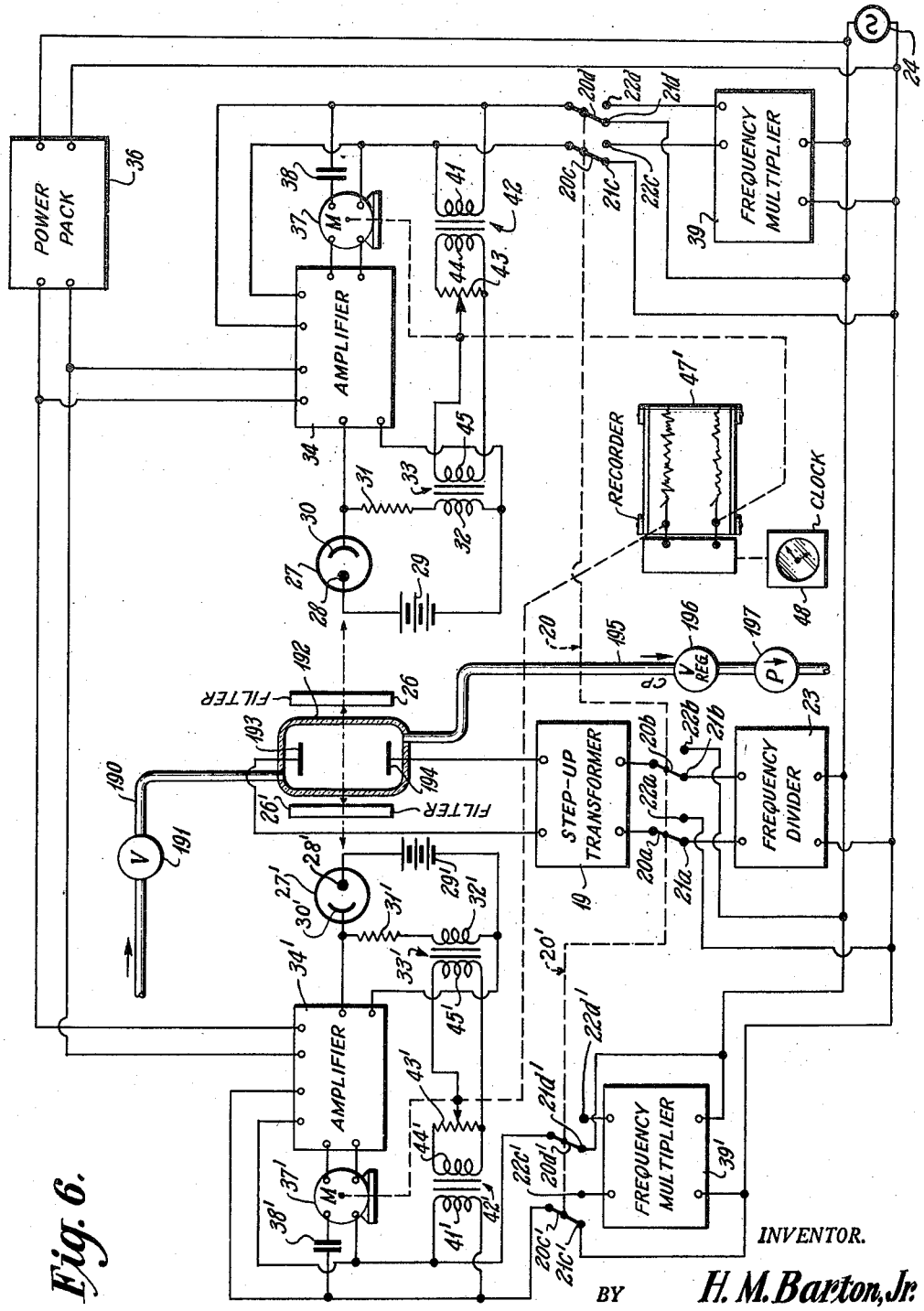

2,872,588

ANALYZER

Hugh M. Barton, Jr., Bartlesville, Okla., assignor to Phillips Petroleum Company, a corporation of Delaware Application November 16, 1953, Serial No. 392,077

15 Claims. (Cl. 250—210)

This invention relates to the analysis of materials by means of the radiation absorption properties thereof. In another aspect it relates to the analysis of materials by means of the radiation emitting properties thereof.

It is known that certain substances have the property of absorbing electromagnetic radiation of wave lengths which are characteristic of the particular substance. These wave lengths are referred to as the absorption spectrum of the substance, and this absorption property has been utilized as the basis for a number of analysis systems. For example, radiation of wave lengths corresponding to the absorption spectrum of a particular substance can be passed through a sample material to be analyzed. The resulting transmitted radiation is measured, whereby the presence of the particular substance under consideration is indicated by a reduction in the transmitted radiation. Various analysis systems employing this general principle in one form or another have been proposed. In most of these systems the transmitted radiation is measured by a radiation responsive device that establishes an electrical signal of magnitude proportional to the total radiation impinging thereon. However, these established electrical signals generally must be amplified before being of sufficient magnitude to be detected readily or to actuate control mechanisms. Furthermore, the amplification of unidirectional currents presents problems which make it desirable to establish an alternating electrical signal representative of the measured radiation.

It further is known that certain substances have the property, under certain conditions, of emitting electromagnetic radiation of characteristic wave lengths. This is particularly true of gases at moderate or low pressures when an electrical discharge is transmitted therethrough. These emitted wave lengths are referred to as the emission spectrum of the substance. Thus, by analyzing the emission spectrum of a sample material it is possible to determine the constituents thereof, and various types of spectroscopes are known for making such analyses.

In accordance with the present invention there is provided an improved method of analyzing sample materials in accordance with the absorption or emission spectra of constituents thereof. In one embodiment of this invention, radiation is transmitted periodically through a sample under analysis to impinge upon a detecting element. The output of the detecting element is amplified and applied to a reversible servomotor. This motor in turn varies a voltage applied in opposition to the detecting element output so as to maintain a zero input signal to the amplifier-motor circuit. The motor is energized in part by current from a common source of alternating voltage which also supplies both current to the radiation source and the balanced voltage to the detecting element output. In order to provide the periodic radiation, a gas-filled tube is energized by an alternating potential of frequency one-half the frequency of the common voltage source. In this manner the tube is fired periodically to emit radiation modulated at the same frequency as the frequency of the common voltage source because the tube fires during a portion of each half cycle of voltage applied thereto.

Alternatively, a voltage of frequency the same as the frequency of the common voltage source is applied across the radiation emitting tube, and a voltage of frequency twice the frequency of the common voltage source is applied to the motor and to the detector output.

In another embodiment of this invention, radiation from a common source is transmitted through separate sample cells to impinge upon respective detecting elements. These detecting elements are connected in a bridge circuit which is balanced continuously by the output rotation of a servomotor in response to electrical unbalance of the bridge circuit, which unbalance is applied as an input signal to the motor.

In a third embodiment of this invention, the sample under analysis is disposed directly between a pair of opposing electrodes so as to become a source of radiation. The frequency of the voltage applied across these electrodes is maintained at one-half the frequency of the voltage applied to the servomotor.

Accordingly, it is an object of this invention to provide improved apparatus for analyzing a sample of material by either the absorption or emission spectra of the constituents thereof.

Another object is to provide an optical analysis system incorporating a servo balancing system whereby the source of radiation is energized at the same frequency as is the balancing system.

A further object is to provide improved methods of analysis.

Various other objects, advantages and features of this invention should become apparent from the following detailed description taken in conjunction with the accompanying drawing in which:

Figure 1 is a schematic representation of a first embodiment of the analyzer of this invention;

Figure 2 is a schematic circuit diagram of the analyzer illustrated in Figure 1;

Figure 3 is a schematic circuit diagram of a frequency multiplier circuit which can be incorporated in the analyzer of this invention;

Figure 4 is a schematic representation of a motor-generator unit which can be employed either as a frequency divider or frequency multiplier;

Figure 5 is a schematic representation of a second embodiment of the analyzer of this invention incorporating a pair of sample cells; and Figure 6 is a schematic representation of a third embodiment of the analyzer which detects the emission spectrum of a fluid sample under analysis.

Referring now to the drawing in detail and to Figure 1 in particular, there is shown a sample cell 10 which is provided with radiation transparent windows 11. A fluid sample under analysis is passed through an inlet conduit 12 to cell 10 through a constant pressure regulating valve 13 and a rate-of-flow controller 14. An outlet conduit 15 communicates with cell 10 to vent the sample. A gas-filled tube 16, which can contain hydrogen or helium, for example, is disposed adjacent cell 10. A pair of spaced electrodes 17 and 18 are contained within tube 16, and the respective output terminals of a voltage step-up transformer 19 are connected to these electrodes. The input terminals of transformer 19 are connected to respective switch arms 20a and 20b of a switch 20. In respective first positions, switch arms 20a and 20b engage respective switch terminals 21a and 21b. These latter terminals are connected to the output terminals of a frequency divider unit 23. The input terminals of frequency divider 23 are connected across the terminals of an alternating current voltage source 24, which can provide 110 volt, 60 cycle electrical energy, for example. In their respective second positions, switch arms 20a and 20b engage respective switch terminals 22a and 22b which are connected to the output terminals of voltage source 24.

Radiation emitted from tube 16 is directed through cell 10 and a filter 26 to impinge upon a photoelectric tube 27. The anode 28 of tube 27 is connected to the positive terminal of a voltage source 29, the negative terminal of which is grounded. The cathode 30 of tube 27 is connected to ground through a resistor 31 and a winding 32 of a transformer 33, these latter two elements being connected in series relation. The cathode of tube 27 also is connected directly to one input terminal of an amplifier 34, the second input terminal of which is grounded. Operating potentials for the several vacuum tubes in amplifier 34 are supplied by a power pack 36 which has the input terminals thereof connected across voltage source 24. The output terminals of amplifier 34 are connected to the first two terminals of a reversible two-phase induction servomotor 37. The third terminal of motor 37 is connected through a capacitor 38 to a switch arm 20d of switch 20, and the fourth terminal of motor 37 is connected to a switch arm 20c of switch 20. In corresponding first positions, switch arms 20c and 20d engage switch terminals 21c and 21d which are connected to respective output terminals of voltage source 24. In corresponding second positions, switch arms 20c and 20d engage switch terminals 22c and 22d which are connected to the output terminals of a frequency multiplier unit 39. The input terminals of frequency multiplier 39 are connected to the respective terminals of voltage source 24. Switch 20 thus permits either unit 23 or unit 39 to be connected into the analyzer circuit at a given time. Switch arms 20c and 20d are also connected to amplifier 34 and to respective terminals of the primary winding 41 of a transformer 42. The end terminals of a potentiometer 43 are connected across the end terminals of the secondary winding 44 of transformer 42. The contactor of potentiometer 43 is connected to one end terminal of the second winding 45 of transformer 33, and one end terminal of potentiometer 43 is connected to the second end terminal of transformer winding 44. The drive shaft of servomotor 37 is mechanically coupled to the contactor of potentiometer 43 and to the arm of a recorder 47 which is driven by a clock 48.

In Figure 2 a first embodiment of the analyzer of Figure 1 is shown in greater detail. The analyzer of Figure 2 incorporates a frequency dividing unit 23 rather than a frequency multiplier unit 39. The illustrated frequency divider network 23 comprises a capacitor 50, a saturable inductor 51 and a filter inductor 52. The cricuit is energized by alternating current source 24 and a direct current source 53 which is connected in series with inductor 52. Inductor 51 is connected in parallel with series-connected inductor 52 and current source 53. One end terminal of this inductor unit is connected to the first terminal of capacitor 50 and the second end terminal of the inductor unit is connected to one end terminal of voltage source 24. The second terminal of capacitor 50 is connected to the second terminal of voltage source 24. A primary winding 54 of transformer 19 is connected in parallel with capacitor 50.

Direct current from source 53 thus flows through inductor 52 and inductor 51 but is effectively blocked from voltage source 24 by the higher resistance of transformer winding 54. This circuit preferably is constructed with inductor 52 having a suitable air gap to avoid excessive magnetization of the core by the direct current flowing through the winding. Saturable inductor 51 is normally constructed with a closed magnetic circuit so as to have a non-linear magnetization characteristic. Inductor 51 can thus be referred to as a non-linear inductance. The combined effect of the direct current from source 53 and the alternating current from source 24 produces an asymmetrical flux condition in inductor 51 which provides, in cooperation with capacitor 50, a negative resistance at a subharmonic frequency. When this negative resistance exceeds the positive circuit resistance, subharmonic oscillations start spontaneously. These subharmonic oscillations are produced most readily at a frequency which is one-half the frequency of source 24 so that transformer 19 supplies a voltage of frequency of one-half the frequency of source 24. This voltage is applied across tube 16 to excite the gas therein and to cause illumination thereof. It should be apparent that tube 16 fires during a portion of each half cycle of applied voltage such that radiation is transmitted through cell 10 from tube 16 at a modulation frequency twice the frequency of the voltage applied across tube 16. This modulation frequency of radiation is, therefore, the same as the frequency of source 24.

The radiation emitted from tube 16 is directed through sample cell 10 and filter 26 to impinge upon photoelectric tube 27. When it is desired to detect the presence of a particular constituent in the sample material passed through cell 10, a filter 26 is provided to transmit radiation of wave lengths corresponding to at least a portion of the absorption spectra of the particular constituent to be detected. Filter 26 can, therefore, comprise any filter having the desired radiation transmitting properties. Filters which transmit extremely narrow bands of radiation can be constructed in the manner described in The Review of Scientific Instruments, December 1953, page 1009. Alternatively, filter 26 can comprise a monochromator selected to pass certain wave lengths of radiation. As employed herein, the term "filter" is intended to include any device which transmits only selected wave lengths of the total radiation incident thereon.

The periodic impingement of radiation upon cathode 30 of photoelectric tube 27 results in a fluctuating potential on cathode 30, taken with respect to ground, which potential is applied through a pair of series connected capacitors 60 and 61 to the control grid of a first triode 62 of amplifier 34. The junction between capacitors 60 and 61 is connected to ground through a resistor 63, and the control grid of triode 62 is connected to ground through a resistor 64. The cathode of triode 62 is connected to ground through a resistor 70 which is shunted by a capacitor 71. The anode of triode 62 is connected to the control grid of a second triode 65 through a capacitor 66 and to a terminal of positive potential B+ through series connected resistors 69, 67 and 68. Power pack 36, which supplies this positive potential B+, is described in detail hereinafter. The control grid of triode 65 is connected to ground through a resistor 72, and the cathode of triode 65 is connected to ground through a resistor 73 which is shunted by a capacitor 74. The anode of triode 65 is connected to the control grid of a third triode 75 through a capacitor 76 and to positive potential terminal B+ through series connected resistors 77, 67 and 68. A capacitor 78 is connected between ground and the junction between resistors 67 and 77, and a capacitor 79 is connected between ground and the junction between resistors 67 and 68.

The cathode of triode 75 is connected to ground through a resistor 81. The grid of triode 75 is connected to ground through a resistor 80. The anode of triode 75 is connected to the control grid of a fourth triode 82 through a capacitor 83 and to positive potential terminal B+ through series connected resistors 84 and 85, the junction between resistors 84 and 85 being connected to ground through a capacitor 86. The anode of triode 82 is connected to positive potential terminal B+ through a resistor 90. The control grid of triode 82 is connected to ground through a resistor 87, and the cathode of triode 82 is connected to ground through a resistor 88. The cathode of triode 82 is also connected directly to the cathode of a fifth triode 91. The anode of triode 91 is connected to one end terminal of a potentiometer 92 through a capacitor 93 and to positive potential terminal B+ through series connected resistors 94 and 90, the junction between resistors 90 and 94 being connected to ground through a capacitor 95. The contactor of potentiometer 92 is connected to the control grid of a sixth triode 96, and the second end terminal of potentiometer 92 is connected to ground. The cathode of triode 96 is connected to ground through a resistor 97, and the anode of triode 96 is connected to positive potential terminal B+ through a resistor 99.

The first-mentioned end terminal of potentiometer 92 is connected to the control grid of triode 91 through a pair of series connected resistors 102 and 103. A pair of capacitors 104 and 105 are connected in series relation with one another and in parallel with series connected resistors 102 and 103. The junction between resistors 102 and 103 is connected to ground through a capacitor 106, and the junction between capacitors 104 and 105 is connected to ground through a resistor 107. Resistors 102, 103 and 107 and capacitors 104, 105 and 106 thus form a parallel-T filter which serves to minimize the transmission through amplifier 34 of stray voltages of frequencies other than the frequency of radiation impinging upon photo cell 27. If voltage source 24 provides 60 cycle current, for example, this parallel-T filter is tuned to 60 cycles so as to present high impedance to 60 cycle signals and relatively low impedance to signals of other frequencies. Accordingly, at frequencies other than 60 cycles, the parallel-T network provides degenerative feedback to the control grid of triode 91. Representative values of the circuit components which will provide this tuning at 60 cycles are as follows: capacitors 104 and 105, 0.01 microfarad each; capacitor 106, 0.02 microfarad; resistors 102 and 103, 265,000 ohms each; and resistor 107, 132,500 ohms.

The anode of triode 96 is connected through a capacitor 110 to the control grids of a pair of triodes 111 and 112, these control grids being connected to ground through a common resistor 117 which is shunted by a capacitor 118. The cathodes of triodes 111 and 112 are connected to ground through a common resistor 113, and the anodes of triodes 111 and 112 are connected to the respective end terminals of the first winding 114 of a transformer 115. The end terminals of the second winding 116 of transformer 115 are connected to the respective terminals of voltage source 24. The center tap of transformer winding 114 is connected to one end terminal of a first coil 120 of motor 37, the second terminal of coil 120 being grounded. One terminal of the second coil 121 of motor 37 is connected to one terminal of voltage source 24, and the second terminal of coil 121 is connected to the second terminal of voltage source 24 through capacitor 38. The drive shaft of motor 37 is mechanically coupled to the contactor of potentiometer 43 and to the arm of recorder 47.

In the analyzer of Figure 2, the second terminal of resistor 31 is connected directly to the contactor of potentiometer 43. A capacitor 123 is connected between the first end terminal of potentiometer 43 and transformer winding 44. The second end terminal of potentiometer 43 is grounded and a variable resistor 124 is connected in shunt with the end terminals of potentiometer 43. As described in greater detail hereinafter, resistor 124 and capacitor 123 form a phase shift network which enables the input signal to amplifier 34 to be reduced to zero.

Power pack 36 includes a transformer 125 having the primary winding 126 connected across the terminals of voltage source 24. The end terminals of a first secondary winding 127 are connected to the respective anodes of a double diode 128. The end terminals of a second secondary winding 129 are connected across the filament of double diode 128. The heaters of the several triodes in amplifier 34 have been omitted from the drawing for purposes of simplicity. The common cathode of double diode 128 is connected to ground through an inductor 130, an inductor 131, a resistor 132 and a resistor 133, these four elements being connected in series relation. A capacitor 134 is connected between the cathode of double diode 128 and ground; capacitor 135 is connected between ground and the junction between inductors 130 and 131; and a capacitor 136 is connected between ground and the junction between inductor 131 and resistor 132. It should readily be apparent that double diode 128 functions as a full wave rectifier and that inductors 130 and 131 and capacitors 134, 135 and 136 function as a filter to maintain a steady positive potential. A gas-filled voltage regulating tube 138 is connected between ground and the junction between resistors 132 and 133, this junction being maintained at a constant positive potential and thus serves as positive potential terminal B+ for the several triodes in amplifier 34.

The analyzer is adjusted initially such that there is no output rotation of motor 37 when a sample of predetermined composition fills cell 10 or when there is no radiation on photoelectric tube 27. This initial balance is obtained by adjustment of the contactor of the potentiometer 43 and resistor 124 such that the voltage at the contactor of potentiometer 43, taken with respect to ground, is equal in magnitude to and is 180° out of phase with any fluctuating voltage established on the cathode 30 of tube 27 by radiation impinging thereon. With the analyzer in such a state of balance, there is no 60 cycle input signal applied to the control grid of triode 62 which forms the first stage of amplifier 34. The output stage of amplifier 34 comprises triodes 111 and 112. Since the respective anodes of these triodes are connected to opposite end terminals of transformer winding 114, the anode of one triode is positive when the other is negative. Each triode thus conducts during alternate half cycles of the voltage applied through transformer 115. In the absence of a 60 cycle signal being applied to the interconnected control grids of triodes 111 and 112, the output of these two triodes consists of two pulses per cycle such that there is no 60 cycle component in the output signal applied to motor coil 120. However, if a 60 cycle signal, either in phase or 180° out of phase with the voltage applied to the anodes of triodes 111 and 112, is applied to the control grids thereof, then one of the output pulses is increased and the other is decreased. This provides a 60 cycle component in the output signal, which in turn is applied to coil 120 of motor 37. Capacitor 38 in series with motor coil 121 shifts the current vector in this coil 90° in relation to the current in the amplifier output motor coil 120. This 90° phase shift provides a rotating magnetic field to drive motor 37. The direction which motor 37 is driven depends upon whether the fluctuating potential created by tube 27 increases or decreases from the original predetermined value. This changes the phase of the amplifier output by 180°. Motor 37 is connected such that the contactor of potentiometer 43 is moved by an amount and in a direction whereby the balance voltage applied therefrom to tube 27 is varied to cause a zero signal to be applied to the amplifier input. The magnitude of this rotation of motor 37 thereby becomes a function of the change in light absorption by the sample in cell 10, which in turn is a function of the composition of the sample material in cell 10. The degree of motor rotation is recorded by recorder 47 which is driven at a predetermined speed by clock 48 to provide a continuous record of the composition of the sample material circulated through cell 10. If desired, suitable process control mechanism can also be actuated by the rotation of motor 37. Furthermore, it should be apparent that the clock 48 can be replaced by a drive which is a function of some other variable, such as temperature, pressure, etc., for special problems.

It should be apparent from a consideration of Figure 1 that the analyzer operates with either frequency divider 23 connected in the circuit or with frequency multiplier 39 connected in the circuit. Thus, in the analyzer of Figure 2 frequency divider 23 can be eliminated and a suitable frequency multiplier circuit connected between motor 37 and voltage source 24. One circuit that can be used in this manner is illustrated in Figure 3.

A voltage source 24 is connected across the primary winding 150 of a transformer 151. The secondary winding 152 is connected across first opposite terminals of a full wave rectifier bridge network 153. The second pair of opposite terminals of bridge 153 is connected across the primary winding 154 of a transformer 155. One end terminal of the secondary winding 156 of transformer 155 is connected to output terminal 22c through a filter inductor 157. The second end terminal of transformer winding 156 is connected to output terminal 22d. A filter capacitor 158 is connected in shunt with transformer winding 156 and a second filter capacitor 159 is connected between output terminals 22c and 22d.

The output signal from the rectifier bridge circuit comprises unidirectional pulses of frequency twice the frequency of voltage source 24. These unidirectional pulses are applied through transformer 155 to produce an alternating signal of frequency twice the frequency of voltage source 24. However, this alternating signal contains several harmonics and as such is rather badly distorted in wave form. The passage of this signal through the low pass filter comprising inductor 157 and capacitors 158 and 159, however, results in an output signal of acceptable wave form to drive motor 37.

In Figure 4 there is shown an alternative circuit arrangement that can be employed as either frequency divider 23 or frequency multiplier 39. Voltage source 24 drives a motor 160 which in turn drives an alternating current generator 161 through suitable gearing 162. The gearing between motors 160 and 161 can be adjusted such that the frequency of output voltage from generator 161, which is applied across output terminals 163 and 164, is either one-half or twice the frequency of voltage source 24. This arrangement can, therefore, be employed as either frequency divider 23 or frequency multiplier 39 depending upon gearing 162.

In Figure 5 there is illustrated a modified form of analyzer wherein the composition of an unknown sample of material can be compared directly against the composition of a second sample which can be of known composition, for example. Radiation emitted from tube 16 is directed through a first sample cell 170 and a first filter 171 to impinge upon a first photoelectric tube 172. A second beam of radiation from tube 16 is directed through a second sample cell 174 and a second filter 175 to impinge upon a second photoelectric tube 176. The cathodes 178 and 179 of respective tubes 172 and 176 are connected to respective end terminals of a potentiometer 180. The anodes 181 and 182 of respective tubes 172 and 176 are connected to the positive terminal of a voltage source 183, and the negative terminal of voltage source 183 is connected to the contactor of potentiometer 180. The first end terminal of potentiometer 180 is connected to the first input terminal of amplifier 34 and the second end terminal of potentiometer 180 is connected to the second input terminal of amplifier 34. The drive shaft of motor 37 is mechanically coupled to the contactor of potentiometer 180. Otherwise the circuit is substantially the same as that illustrated in Figure 1 and corresponding elements are designated by like reference numerals.

The photoelectric tubes in the analyzer of Figure 5 are thus connected in a form of Wheatstone bridge circuit. As long as equal radiation impinges upon the two tubes, the bridge circuit remains in balance such that a zero voltage signal is applied to the input of amplifier 34. Any difference in intensity of radiation impinging upon the two cells, however, results in an unbalance of the bridge circuit such that a fluctuating input signal is applied to amplifier 34. This signal in turn drives motor 37 to adjust the contactor of potentiometer 180 by an amount needed to restore the bridge circuit to a condition of electrical balance. In this manner a direct comparison between the radiation absorption properties of the materials in sample cells 170 and 174 is obtained from the position of the contactor of potentiometer 180 which is indicated on recorder 47.

In Figure 6 there is shown a second embodiment of analyzer that is useful in determining the presence of particular constituents in a gaseous mixture. The gas sample to be analyzed is passed through an inlet conduit 190 having a valve 191 therein to a vessel 192 having a pair of opposing electrodes 193 and 194 contained therein. An outlet conduit 195 is connected to the opposite end of vessel 192. Conduit 195 has a constant inlet pressure regulating valve 196 therein and a vacuum pump 197 downstream from valve 196 such that the sample in vessel 192 can be maintained at a constant low pressure in the general range of between thirty microns and two millimeters of mercury. The output terminals of step-up transformer 19 are connected to respective electrodes 193 and 194. In this manner the gas sample under analysis is subjected to an electrical discharge which results in the gases present in vessel 192 emitting radiation of wave lengths characteristic thereof. A first filter 26 is adjusted to transmit radiation to tube 27 of wave lengths characteristic of at least a part of the emission spectra of a particular constituent in the mixture being analyzed. Thus, any signal received by photo cell 27 is indicative of the presence of the particular constituent whose emission spectra is transmitted by filter 26. The analyzer circuitry is identical to that illustrated in Figure 1 and corresponding elements are designated by like reference numerals.

A second analyzer circuit is shown in Figure 6 which corresponds to the first circuit, and wherein like elements are designated by like primed reference numerals. Filter 26' in this second circuit, however, is adjusted to transmit wave lengths characteristic of a second constituent of the gaseous mixture being analyzed. The two signals are recorded on separate channels of a recorder 47'. Furthermore, any desired number of these analyzer circuits can be provided in like manner to detect the presence of other selected constituents in the gaseous sample passed through vessel 192. The operation of th individual analyzer circuits is generally the same as that previously described except that the emission spectrum of the sample is detected rather than the absorption spectrum. It is known that materials have emission and absorption spectra at corresponding wave lengths.

From the foregoing description it should be apparent that there is provided in accordance with this invention an improved system of analysis based upon the light emission and/or absorption spectra of the materials under consideration. While this invention has been described in conjunction with present preferred embodiments thereof, it should be apparent that the invention is not limited thereto.

What is claimed is:

1. An analyzer comprising a gas filled tube having a pair of spaced electrodes therein, means for applying an alternating potential of a first frequency across said electrodes, a radiation detector disposed in the path of radiation emitted from said tube, a two phase induction servomotor, means responsive to said detector to apply a first signal to the first input of said motor of the same frequency as the frequency of the radiation impinging on said detector, means to apply a second signal to the second input of said motor which is of a frequency twice said first frequency, and means under control of said motor to vary the magnitude of the signal applied to the first input of said servomotor until rotation of said motor in terminated.

2. The combination in accordance with claim 1 further comprising means for positioning a sample of material to be analyzed in the path of radiation between said tube and said detector.

3. An analyzer comprising a gas filled tube having a pair of spaced electrodes mounted therein, means for applying an alternating potential of a first frequency across said electrodes, a radiation responsive device positioned in the path of radiation emitted from said tube to establish an alternating electrical signal of frequency corresponding to the frequency of radiation impinging thereon, a two phase induction servomotor, means for applying a first alternating electrical signal to said motor which is proportional in magnitude to the signal established by said radiation responsive device and of the same frequency, means for applying a second alternating electrical signal to said motor of frequency twice said first frequency, means for applying an electrical signal of frequency twice said first frequency in opposition to the signal established by said radiation responsive device, and means under control of said servomotor to vary the magnitude of said last-mentioned signal until the rotation of said servomotor is terminated.

4. The combination in accordance with claim 3 wherein the potential applied across said electrodes and said second electrical signal applied to said motor are obtained from a voltage source of frequency twice said first frequency, and further comprising a frequency dividing circuit connected between said electrodes and said voltage source.

5. The combination in accordance with claim 4 wherein said frequency dividing circuit comprises a motor having the input terminals thereof connected to said voltage source, an alternating current generator, and means mechanically connecting said motor and said generator so that said generator is rotated at a speed such that the voltage generated thereby is of frequency one-half the frequency of said voltage source.

6. The combination in accordance with claim 3 wherein the potential applied across said electrodes is obtained from a source of frequency equal to said first frequency, and further comprising a frequency multiplying circuit connected between said voltage source and both said servo motor and said means for applying said second electrical signal.

7. The combination in accordance with claim 6 wherein said frequency multiplying circuit comprises a motor having the input terminals thereof connected to said voltage source, an alternating current generator, and means mechanically connecting said motor and said generator so that said generator is rotated at a speed such that the voltage generated thereby is of frequency twice the frequency of said voltage source.

8. The combination in accordance with claim 6 wherein said frequency multiplier circuit comprises a full wave rectifier, means connecting said voltage source across full wave rectifier, a transformer in the output circuit of said full wave rectifier, and a low pass filter connected in the output circuit of said transformer, the output terminals of said low pass filter supplying a voltage of frequency twice the frequency of said voltage source.

9. An analyzer comprising a gas filled vessel having a pair of spaced electrodes therein, means for applying an alternating potential of a predetermined frequency across said electrodes, a photoelectric tube disposed in the path of radiation emitted from said vessel, a source of positive potential connected to the anode of said tube, a source of alternating potential connected in circuit with said tube, said source of alternating potential being of twice the frequency of said predetermined frequency, an amplifier having the input terminals thereof connected in circuit with said tube, a two phase induction servomotor connected to the output terminals of said amplifier, and means under control of said motor to vary the magnitude of said alternating potential until said alternating potential balances the fluctuating voltage generated by radiation impinging upon said tube such that a zero input signal is applied to said amplifier.

10. The combination in accordance with claim 9 further comprising means for positioning a sample of material to be analyzed in said path of radiation between said vessel and said tube.

11. An analyzer comprising a gas-filled vessel having a pair of spaced electrodes mounted therein, means for applying an alternating potential of a first frequency across said electrodes, a first photoelectric tube positioned in a first path of radiation emitted from said vessel, a second photoelectric tube positoned in a second path of radiation emitted from said vessel, a pair of impedance elements connected in circuit with said first and second tubes to form a bridge network, a source of electrical energy applied across said bridge network, a two phase induction servomotor, means interconnecting said motor and said bridge network so that an alternating electrical signal is applied to the first input of said motor which is proportional to the difference in radiation impinging upon said tubes, means for applying a second alternating electrical signal to the second input of said motor of frequency twice said first frequency, and means under control of said motor to vary the magnitude of at least one of said impedance elements until the rotation of said motor is terminated.

12. The combination in accordance with claim 11 wherein the interior of said gas-filled vessel is in communication with a sample of material to be analyzed such that the radiation emitted from said gas-filled vessel represents the emission spectrum of the material being analyzed, and further comprising filter means disposed between said gas-filled vessel and each of said photoelectric tubes.

13. An analyzer comprising a vessel having a pair of opposing electrodes mounted therein, a source of alternating voltage of predetermined frequency applied across said electrodes, an inlet conduit communicating with said vessel to pass a gas sample to be analyzed into said vessel, an outlet conduit having a vacuum pump therein communicating with said vessel, valve means in one of said conduits to maintain a predetermined pressure within said vessel, a radiation detector disposed in the path of radiation emitted from said vessel, a filter disposed between said vessel and said detector, said detector establishing an electrical signal of magnitude proportional to the radiation impinging thereon, a two phase induction servo motor, means for applying said electrical signal to the first input of said servo motor, means for applying an electrical signal of frequency twice said predetermined frequency to the second input of said servo motor from said source of alternating voltage, means for applying a second electrical signal of said predetermined frequency in opposition to the first-mentioned electrical signal, and means under control of said servo motor to vary the magnitude of the second-mentioned signal until equal to the first-mentioned signal.

14. An analyzer comprising a vessel having a pair of opposing electrodes mounted therein, a source of alternating voltage of predetermined frequency applied across said electrodes, an inlet conduit communicating with said vessel to pass a gas sample to be analyzed into said vessel, an outlet conduit having a vacuum pump therein communicating with said vessel, valve means in one of said conduits to maintain a predetermined pressure within said vessel, a photoelectric tube disposed in the path of radiation emitted from said vessel, a filter disposed between said vessel and said tube, a photoelectric tube disposed in the path of radiation emitted from said source, a source of positive potential connected to the anode of said tube, a source of alternating potential connected in circuit with said tube, said source of alternating potential being of the same frequency as the frequency of said source of radiation, an amplifier having the input terminals thereof connected in circuit with said tube, a two phase induction servo motor having the first input thereof connected to the output terminals of said amplifier, means to apply an electrical signal of frequency twice said predetermined frequency to the second input of said motor, and means under control of said motor to vary the magnitude of said alternating potential until said alternating potential balances the fluctuating voltage generated by radiation impinging upon said tube such that a zero input signal is applied to said amplifier.

15. An analyzer comprising a radiation source, means for energizing said radiation source at a predetermining frequency, a photoemissive tube having an anode and a cathode, said tube being spaced from said radiation source and positioned so that said cathode is illuminated by radiation emitted from said radiation source, whereby a test material can be positioned between said radiation source and said tube, a direct voltage source, an alternating voltage source, means connecting said direct and alternating voltage sources in series relationship with said tube so that the positive terminal of said direct voltage source is applied to said anode and the negative terminal of said direct voltage source is applied to said cathode, an amplifier, means connecting the input terminals of said amplifier to the circuit of said tube and said voltage sources so that the input signal to said amplifier is representative of conduction by said tube, a servomotor, means applying the output terminals of said amplifier to said servomotor to energize same, and means connecting said servomotor to said alternating voltage source to vary the magnitude of said alternating voltage source in response to the output signal of said amplifier until the output signal of said amplifier is reduced to zero.

References Cited in the file of this patent
UNITED STATES PATENTS

| | | |
|---|---|---|
| 2,245,124 | Bonn | June 10, 1941 |
| 2,358,103 | Ryder | Sept. 12, 1944 |
| 2,411,672 | Van Den Akker | Nov. 26, 1946 |
| 2,431,899 | Wolf | Dec. 2, 1947 |